Patented Mar. 18, 1941

2,235,208

UNITED STATES PATENT OFFICE 2,235,208

COLORATION OF TEXTILE AND OTHER MATERIALS WITH ANTHRAQUINONE DYESTUFFS

George Holland Ellis and Henry Charles Olpin, Spondon, near Derby, England, assignors to Celanese Corporation of America, a corporation of Delaware No Drawing. Application September 21, 1938, Serial No. 231,016. In Great Britain October 9, 1937

7 Claims. (Cl. 8—40)

This invention relates to the coloration of materials with dyestuffs of the anthraquinone series and also to the manufacture of such dyestuffs.

It has been discovered that derivatives of anthraquinone which contain one or more auxochrome groups and an alkyl group which is substituted by a sulphonic acid radicle and salts of such derivatives are very good dyestuffs for cellulose ester and ether materials and the present invention includes the manufacture of the dyestuffs, the dyestuffs themselves as produced by the processes hereinafter set forth or by chemical equivalents of such processes, compositions of matter containing the dyestuffs, processes for the coloration of materials with the dyestuffs and the colored materials so obtained.

The alkyl group substituted by a sulphonic acid radicle whether in the form of the free acid or as a salt is referred to hereafter in this specification as a "sulpho-alkyl" group. Preferably the dyestuffs contain only one such group.

The sulpho-alkyl group may be linked directly to the anthraquinone nucleus or may be linked thereto through oxygen, nitrogen or sulphur atoms. Or, again, a sulpho-alkyl group may be linked to the anthraquinone nucleus through another group, e. g. an aryl group. The auxochrome groups present in the dyestuffs may be hydroxy or substituted hydroxy groups or mercapto groups, amino groups or substituted amino groups. Of especial importance according to the present invention are anthraquinone compounds substituted in the 1 and/or 4 positions of the anthraquinone nucleus by amino or substituted amino groups, a sulpho-alkyl group being linked to the anthraquinone nucleus either through an amino or substituted amino group or being linked to the anthraquinone nucleus in the 2 or 3 position.

The alkyl groups of the sulpho-alkyl groups characteristic of the compounds of the present invention may be, for example, ethyl, propyl, butyl and other groups, and the alkyl group may contain other substituents in addition to the sulphonic acid radicle, e. g. a hydroxy group as in the β-hydroxy-γ-sulpho-propyl radicle.

Amino or hydroxy groups present in the compounds may be substituted, e. g. by alkyl, aryl, aralkyl or oxyalkyl groups. Any aryl radicles present are preferably of the benzene series. Moreover, such aryl radicles may themselves be substituted, e. g. by alkyl groups, hydroxy groups, alkoxy groups, amino groups, substituted amino groups, halogen atoms or other substituents. Or, again, as indicated above, such aryl groups may be substituted by sulpho-alkyl groups. Where alkyl-substituted hydroxy or amino groups are substituted in the anthraquinone nucleus the alkyl radicle may be, for example, a methyl group or ethyl group. Again, amino groups present may be substituted by acidyl groups, e. g. acetyl groups.

As examples of specific compounds which may be employed according to this invention the following may be mentioned: 1-sulphoethylamino-anthraquinone, 1-amino-2-sulphoethoxy-anthra-quinone, 1:4-diamino-2-sulphoethoxy-anthraquinone, 1-amino-4-sulphoethylamino-anthraquinone, 1-methylamino-4-sulphoethylamino-anthraquinone, 1-sulphoethylamino-4-phenylamino-anthraquinone, 1-amino-4-methylamino-2-sulphoethoxy-anthraquinone, 1-amino-4-phenylamino-2-sulphoethoxy-anthraquinone, 1-amino-4-(4'sulphoethoxyphenyl)-amino-anthraquinone, 1-amino-4-(4'sulphoethylphenyl)-amino-anthraquinone, 1-amino-4-phenylamino-2-sulphoethyl-anthraquinone, 1-amino-4-(4'sulphoethylamino)-phenylamino-anthraquinone.

The new dyestuffs may be produced by various processes. Thus they may be produced from anthraquinone compounds substituted in the desired positions by the auxochrome group or groups and by an alkyl grouping containing a group readily replaceable by a sulphonic acid group by effecting such replacement. For example, an anthraquinone compound containing both an auxochrome group and an alkyl group which contains an ω-halogen atom or an ω-sulphate group may be treated so as to replace such halogen atom or sulphato group with a sulphonic acid group, e. g. by the action of an alkali metal sulphite. Thus an anthraquinone derivative containing an oxyalkyl group linked to the anthraquinone nucleus through sulphur or oxygen, as described in U. S. Patent No. 1,854,461, or through nitrogen, as described in U. S. Patent No. 1,854,460, may be reacted with phosphorus pentachloride so as to replace the ω-hydroxy group by a chlorine atom and the chlorine containing derivative thus obtained may be heated with sodium sulphite at e. g. 120°–130° C. in the presence of alcohol or other suitable diluent until the chloralkyl radicle has been converted into a sulpho-alkyl radicle. Similar products may be obtained from chlor-alkyl anthraquinones and sodium bisulphite.

Again, the new compounds may be obtained from anthraquinone compounds substituted in the desired position with a group or atom which is convertible into, or replaceable by, a sulphoalkyl group, or a radicle containing a sulphoalkyl group, by effecting such conversion or replacement. For example, anthraquinone compounds containing halogen atoms, e. g. nuclear halogen atoms or halogen atoms linked to the nucleus through alkyl, aryl, or other groups, may be converted into the corresponding sulphoalkylamino compounds by treatment with taurine or mono-N. substituted taurines, e. g. N.(4-aminophenyl)-taurine. Again, an anthraquinone compound containing an amino group may be condensed with a halogen alkyl sulphonic acid, e. g. β-chlorethyl sulphonic acid.

As indicated above, the anthraquinone compounds produced according to the invention contain an auxochrome group in addition to the sulpho-alkyl group. A further method of preparing the compounds, therefore, is from anthraquinone compounds containing a sulpho-alkyl group and an atom or group which can be replaced by or converted into an auxochrome group, by effecting such replacement or conversion. For example, a halogen atom, alkoxy group, or hydroxy group in an anthraquinone compound containing a sulpho-alkyl group may be replaced by an amino group or a substituted amino group by the action of ammonia or an amine, or a nitro group in such a compound may be converted into an amino group by reduction. Again, an auxochrome group, e. g. an amino group, and a sulpho-alkyl group may be introduced simultaneously into an anthraquinone compound.

The dyestuffs are of especial value for the coloration of cellulose acetate materials though they may also be employed for the coloration of other organic derivative of cellulose materials. As examples of other organic derivatives of cellulose reference may be made to cellulose formate, cellulose propionate and cellulose butyrate and to the ethyl, butyl and benzyl ethers of cellulose. The dyestuffs may also be employed in the coloration of mixed materials comprising one or more of the aforesaid cellulose esters or ethers in admixture with other textile fibres, for example, wool, silk or other animal fibres, or cotton, regenerated cellulose or other cellulosic materials. Such other fibres may be colored by the same dyestuffs as the cellulose esters or ethers when they possess the requisite affinity, or they may be colored either in the same or different shades by means of other dyestuffs, either before, after or simultaneously with the coloration of the cellulose esters or ethers.

The anthraquinone dyestuffs may be applied to textile materials in solution or, where they are not sufficiently soluble for this purpose, may be applied in aqueous suspension or after being brought into colloidal form. The solutions of the dyestuffs employed for dyeing the cellulose ester and ether materials may contain salts, e. g. sodium sulphate, in order to improve the dyeing, and the invention is to be understood to include compositions containing the dyestuffs together with salts and/or other substances, e. g. thickeners and the like.

The dyestuffs may be applied to the materials in various ways, for example, by dyeing or other method of uniform application or by printing, stencilling or other method of local application.

The following examples illustrate the invention but are not to be regarded as limiting it in any way:

*Example 1*

1-oxyethylamino-4-methylamino-anthraquinone is reacted with phosphorus pentachloride so as to replace the hydroxy group by chlorine. 100 parts of the product are then heated in an autoclave for about 4 hours at 130° C. with about 125 parts of sodium sulphite in the presence of about 2,000 parts of 50% alcohol. When the reaction is complete sodium chloride is added to the reaction mixture and the dyestuff separated off. It may if desired be purified by recrystallisation from water in the presence of animal charcoal. It may be employed for dyeing cellulose acetate materials in the following manner.

1 part of the sodium salt of the dyestuff is dissolved in a dye bath containing 1,500 parts of water and 50 parts of previously scoured cellulose acetate knit fabric is entered. The goods are dyed for about 1½ hours at 80° C. during which time 10 parts of common salt is added as necessary in order to assist exhaustion. The goods are then lifted, rinsed and dried or finished as desired.

*Example 2*

1-hydroxyethylamino-anthraquinone obtained e. g. as described in Example 2 of U. S. Patent No. 1,854,460 is reacted with phosphorus pentachloride so as to replace the hydroxy group by chlorine. The sulpho-alkyl derivative is then prepared as described in the preceding example and this is brominated and reacted with aniline in the presence of a copper catalyst to give 1-sulphoethylamino-4-phenylamino-anthraquinone. This dyestuff may be employed for printing cellulose acetate materials in the following manner:

A printing paste is made up containing

| | Parts |
|---|---|
| Sodium salt of 1-sulphoethylamino-4-phenylamino-anthraquinone | 30 |
| Ethylenethioglycol | 100 |
| Sodium dibenzyl metanilate | 20 |
| Water | 350 |
| British gum thickening | 500 |

The paste is printed on to cellulose acetate woven fabric, dried and steamed for 30 minutes in moist steam in an open steamer and then washed.

*Example 3*

1-oxy-4-mercapto-anthraquinone obtained, for example, as described in Example 2 of U. S. Patent No. 1,854,461 is condensed with ethylene chlorhydrin. The product is reduced to the leuco state with caustic soda and hydrosulphite and the dried leuco body refluxed on a water bath with methylamine. The dyestuff obtained is then chlorinated with phosphorus pentachloride and the chlorinated derivative reacted with sodium sulphite as described in Example 1 in order to obtain a dyestuff containing a sulpho-alkyl group linked to the anthraquinone nucleus through sulphur.

*Example 4*

An anthraquinone dyestuff containing a sulpho-alkyl group linked to the nucleus through an oxygen atom may be obtained by chlorinating with phosphorus pentachloride the product obtained from 1-acetylamino-4-oxyanthraquinone and ethylene chlorhydrin described in Example 3 of U. S. Patent No. 1,854,461, reacting the intermediate with sodium sulphite as described in Example 1 and finally removing the acetyl radicle attached to the amino group by hydrolysis.

*Example 5*

The following is an alternative method of obtaining the product of Example 4.

1-nitro-4-oxyanthraquinone is condensed with ethylene chlorhydrin and the 1-nitro-4-oxyethoxy-anthraquinone obtained is reacted with phosphorus pentachloride. The chlorinated product is then reacted with sodium sulphite as described in Example 1 and the product containing a sulphoethoxy group is then treated with sodium sulphide in order to effect or complete reduction of the nitro group.

*Example 6*

This example shows the production of a dyestuff in which the sulpho-alkyl group is attached to an aryl group attached to the anthraquinone nucleus.

1-methylamino-4-(4'-amino-phenylamino)-anthraquinone is condensed with ethylene chlorhydrin, the product is chlorinated with phosphorus pentachloride and then reacted with sodium sulphite as described above.

The dyestuffs obtained according to Examples 3-6 may be employed in dyeing materials made of organic derivatives of cellulose as described in Examples 1 and 2.

Having described our invention, what we desire to secure by Letters Patent is:

1. Process for the coloration of artificial filaments, yarns and other materials containing organic derivatives of cellulose, which comprises coloring them with anthraquinone derivatives which contain an auxochrome group and, attached directly to an aromatic nucleus, a substituent radicle selected from the group consisting of the sulpho-alkyl, sulpho-alkoxy and sulpho-alkyl-thio radicles which contain at least two carbon atoms.

2. Process for the coloration of artificial filaments, yarns and other materials containing organic derivatives of cellulose, which comprises coloring them with anthraquinone derivatives which contain a sulpho-alkyl group containing at least two carbon atoms attached directly to the anthraquinone nucleus.

3. Process for the coloration of artificial filaments, yarns and other materials containing organic derivatives of cellulose, which comprises coloring them with anthraquinone derivatives which contain a sulpho-alkyl group containing at least two carbon atoms attached to the anthraquinone nucleus through a single atom which is an oxygen atom.

4. Process for the coloration of artificial filaments, yarns and other materials containing organic derivatives of cellulose, which comprises coloring them with anthraquinone derivatives which contain a sulpho-alkyl group containing at least two carbon atoms attached to the anthraquinone nucleus through a single atom which is a sulphur atom.

5. Process for the coloration of artificial filaments, yarns and other materials containing cellulose acetate, which comprises coloring them with anthraquinone derivatives which contain a nuclear auxochrome group and a single sulphoethyl group attached directly to the anthraquinone nucleus.

6. Process for the coloration of artificial filaments, yarns and other materials containing cellulose acetate, which comprises coloring them with anthraquinone derivatives which contain a nuclear auxochrome group and a single sulphoethyl group attached to the anthraquinone nucleus through a single atom which is an oxygen atom.

7. Process for the coloration of artificial filaments, yarns and other materials containing cellulose acetate, which comprises coloring them with anthraquinone derivatives which contain a nuclear auxochrome group and a single sulphoethyl group attached to the anthraquinone nucleus through a single atom which is a sulphur atom.

GEORGE HOLLAND ELLIS.
HENRY CHARLES OLPIN.